UNITED STATES PATENT OFFICE.

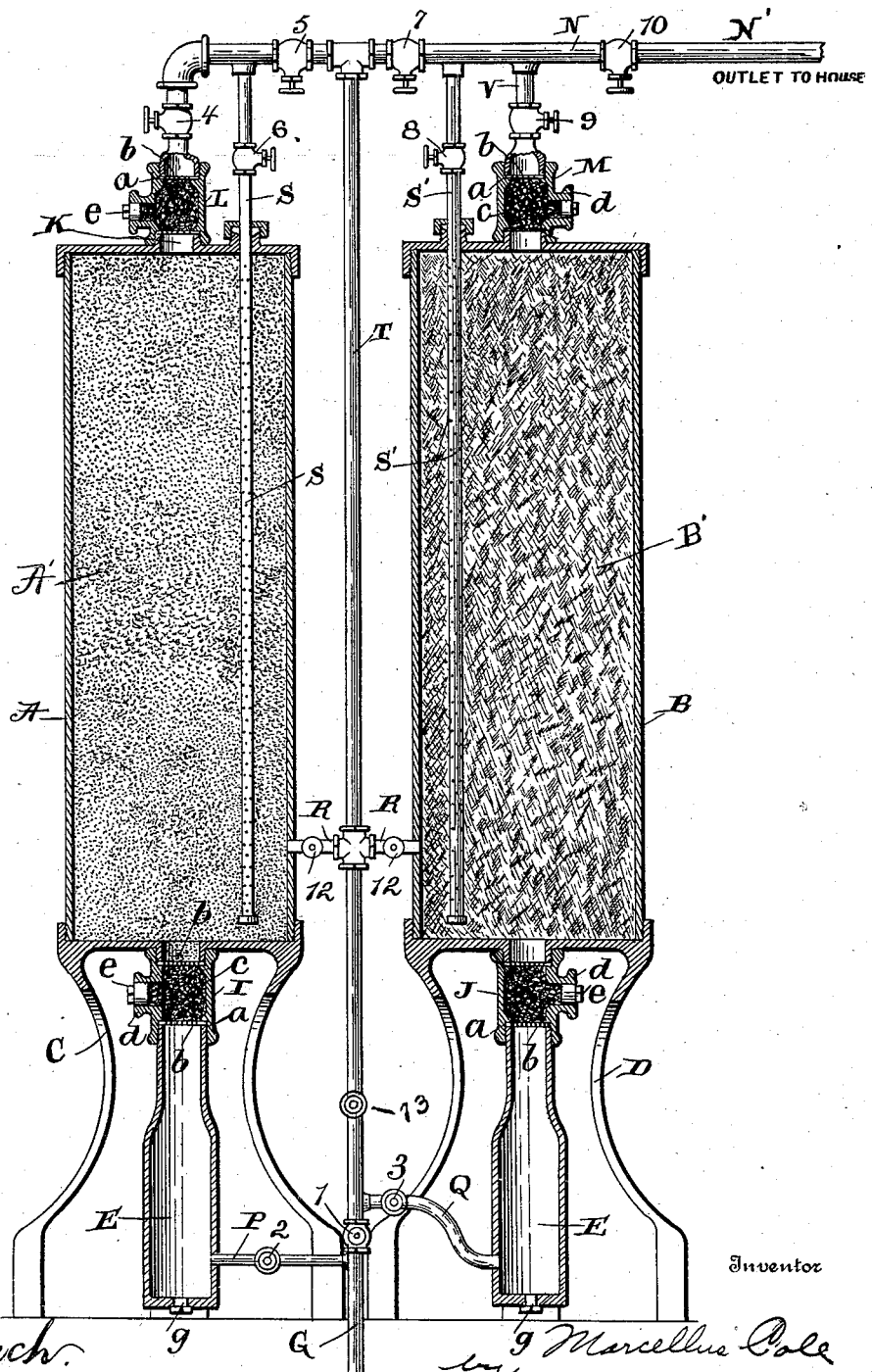

MARCELLUS COLE, OF WASHINGTON, DISTRICT OF COLUMBIA.

FILTERING APPARATUS.

SPECIFICATION forming part of Letters Patent No. 654,783, dated July 31, 1900.

Application filed April 23, 1900. Serial No. 13,954. (No model.)

*To all whom it may concern:*

Be it known that I, MARCELLUS COLE, a citizen of the United States, residing at Washington, in the District of Columbia, have invented certain new and useful Improvements in Filtering Apparatus, of which the following is a specification.

My invention relates to improvements in filters; and it pertains to a filter which is adapted to supply filtered water to houses, hotels, and other places where filtered water is desirable.

One object of my invention is to provide a filter consisting of two parallel cylinders, one constituting a primary filter and the other a secondary purifying or final filter, the inlets and outlet therewith being so arranged that water is conveyed from the main upward through the primary filter and then returned and carried upward through the secondary or final filter instead of filtering from the top of the filtering cylinders or chambers, as is usually the case.

A further object of my present invention is to so construct the water communications with these filtering cylinders or chambers that they can be easily cleaned either simultaneously or separately by reversing the flow of the water from the main—that is, by causing it to move downward and through the lower end of the filtering chamber or chambers—or by means of which communication and their controlling-valves the cylinders can be separately and independently washed or flushed with water which has been previously cleaned by passage through the other chamber or cylinder, or by means of said water communications and their controlling members or valves water can be taken directly from the main and carried to the point of consumption without passing through either of the said filtering-chambers, or water can be taken from the main and carried through either one of the filtering-chambers independently and then conveyed to the source of consumption.

A further object of my invention is to provide a vertically-arranged combined supplying and settling chamber into which the water first passes before it enters either of the said filtering-chambers, whereby the water in standing will settle and the sediment be collected in the bottom of the said combined supplying and settling chambers, whereby when the filter is being used the water from the combined supplying and settling chambers is first carried through the filter, thus having the advantage of first settling the water before it is filtered, and thus relieving the filters of a considerable amount of filtering which is required where the water is taken directly to the filtering-chambers without any settling operation. These combined supplying and settling chambers will preferably be of a size sufficient to fill an ordinary receptacle—such as a pail, pitcher, or pan.

The object of my invention pertains, further, to the specific construction and arrangement of the parts, all of which will be fully described hereinafter and particularly referred to in the claims.

The accompanying drawing is a vertical sectional view, the pipes being partly shown in full lines, of a filtering apparatus embodying my invention.

Referring now to the drawing, A indicates a vertically-arranged primary-filtering chamber or cylinder, and B a secondary vertically-arranged final-filtering or purifying chamber which is arranged parallel and adjacent to the primary cylinder A. Each of the cylinders or chambers are here shown as provided, respectively, with the supporting-pedestals C and D, though they may be otherwise supported, if desired. Situated below and in communication with the bottoms of each of these vertically-arranged filtering-chambers A and B are the combined supply and settling chambers E. Situated between the upper ends of the combined settling and supply chambers E and the lower ends of the filtering-chambers A and B, respectively, and establishing communication between the settling and supply chambers E and the said filtering-chambers are castings I, and situated at the upper ends of the chambers A and B are similar castings or connections L and M, respectively. Each of these castings I, J, L, and M are provided with laterally-extending shoulders *a*, against which are placed suitable sieves *b*, and the sieves *b* are clamped, respectively, between the upper ends of the combined supply and settling chambers E and the ends of the short pipes K or connections, which project, respectively, from the upper and lower ends of the said chambers or cylinders A and B. Each of these castings I, J, L, and M are provided with laterally-projecting flanged openings $d$, which are provided with closing-plugs $e$, and situated within these castings, between the sieves $b$, is material $c$. The object of the laterally-projecting openings $d$ is to permit the ready insertion or removal of the sponges or equivalent material $c$ for the purpose of removing them for the purpose of cleaning or for the purpose of substituting new sponges and also for the purpose of facilitating the insertion of the sponges in their proper position when the filters are manufactured.

G is a pipe which communicates with the water-main, and projecting from this pipe, near its lower end, is a pipe P, which has communication with the lower end of the combined supply and settling chamber E, which is in communication with the primary-filtering chamber A, and a laterally-projecting pipe Q, which is situated above the pipe P and in communication with the chamber E, which is below and in communication with the final-filtering chamber B. The pipe G, between the pipes P and Q, is provided with a valve $l$, by means of which the flow of the water is controlled, and the pipes P and Q are each respectively provided with the valves 2 and 3 for the same purpose.

Extending across the upper ends of the chambers A and B is a pipe N, having one end in communication with the upper end of the primary-filtering chamber A and its opposite end N′ being the outlet end of the pipe, which is in communication with the house or other source of consumption. A valve 4 is situated just above the casting L, at the upper end of the chamber A, and a valve 9 is situated just above the castings M, at the upper end of the chamber B. Depending from the pipe N, at a point between the inlet end of the pipe N and the pipe V, which establishes communication between the pipe N and the upper end of the chamber B, is a pipe T, which has communication at its upper end with the pipe N and at its lower end with the pipe G, that communicates with the water-main. Situated between the valve 4 and the upper end of the pipe T is a valve 5, and depending from the pipe N, between the valve 4 and the valve 3, is a cleaning or flushing pipe S, which extends downward within the chamber A and is provided with a plurality of perforations, through which the water will flow into the chamber A. A similar pipe S′ is provided for the final-filtering chamber B, and the upper end of this pipe is in communication with the pipe N, between a valve 7 and the pipe V, and this pipe S′ is provided with a valve 8.

Situated in the pipe N is another valve 10, which is located between the communication V with the upper end of the final-filtering chamber B and the outlet end of the pipe N. These valves serve in a manner which will be hereinafter described to control the flow of the water through the filtering-chambers and also to control the flow of the water independently of the filtering-chambers.

Projecting from the lower portion of the pipe T and in communication with the lower ends of the chambers A and B are the pipes R, each of which is provided with controlling-valves 12, and these pipes R are used for the purpose of assisting with the cleaning or flushing of the chambers A and B by reversing the flow of the water through them when it is desired to clean the filter.

The primary-filtering chamber A is filled with sharp sand and crushed stone A′ and the final or purifying filtering chamber B is filled with charcoal B′.

The bottoms of each of the combined supply and settling chambers E are provided with plugs or valves $g$, by means of which they may be opened for the passage of the sediment through these chambers E and into suitable receptacles placed therefor, or, if desired, these outlets $g$ may be connected in any suitable manner with the sewer.

The operation of the filter when using both of the filtering-chambers (which is the preferred operation of the apparatus) for filtering the water is as follows: The valves 1, 12, 6, 7, and 8 are closed and the valves 2, 4, 5, 3, 9, and 10 are open. The water passing from the water-main passes into the pipe G, through the pipe P, and into the lower portion of the combined settling and supply chamber E, where the water stands when the filter is not in use, and the heavy matter held in suspension within the water settles to the bottom of the said chamber. When the supply end N′ is opened in the house or other point of consumption the water which has settled in the settling-chamber E passes through the sponge C′, through the primary chamber A, the pipe N, down the pipe T, and into the lower portion of the combined settling and supply chamber E. At the bottom of the final-filtering chamber B, passes through the sponge at the upper end of the settling and supply chamber E, through the chamber B and the pipe V into the pipe N and to the point of consumption. When it is desired to use the water direct from the main without filtering it, the valves 2, 3, 12, 5, 9, and 8 are closed, when the water will pass directly from the water-main to the point of consumption. If it is desired to have the water pass only through the primary-filtering chamber A, the valves 1, 3, 6, 8, and 9 are closed, when the water will pass through the primary filterer and on to its source of consumption. Should it be desired to pass the water through only the final-filtering chamber B, the valves 2, 13, 12, 7, and 8 are closed, when the water will flow through the final-filtering chamber B to the source of consumption.

Attention is particularly called to the fact that in the use of the filtering apparatus of the construction shown the filtering is done from the bottom of the filtering-chamber, which is considered the proper method of filtering, rather than from the top of the chamber, for the reason that the sediment in the water to be filtered has a tendency to settle to the bottom and by passing it from the bottom the filter has the advantage of the specific gravity of the matter held in suspension as it passes through the respective filtering-chambers, and the specific gravity of the matter held in suspension assists the filter in holding that matter back to the inlet ends of the filtering-chambers.

When it is desired to clean the chambers, the flow of the water through the medium of the valves is reversed—that is, caused to pass downward through the filtering-chambers— and this may be done by having it pass through both of the chambers simultaneously or through each of them separately or be first filtered by passing through one and then through the other, and vice versa. The method of accomplishing this is as follows: If it is desired to clean both of the filtering-chambers simultaneously, the valves 3, 2, and 10 are closed, while the other valves are open, but, if desired, in addition to the closing of these valves just stated the valves 9 and 4 may be closed. In the former instance the water will pass through the pipe G, the pipes R, and through the pipes S S' and the upper end of the chambers, and in the latter case the water will pass only through the pipes 12 and the pipes S and S', as may be desired and as will be readily understood. By the proper manipulation of these valves it will be readily understood that either of these filters may be separated, and in the cleaning operation of them, separately or otherwise, the valves or plugs g are opened at the bottom of the combined supply and settling chambers E, and the water then will pass through these opening and into suitable receptacles placed therefor or by a suitable connection into the sewer. The flow of the water in the cleaning operation will be regulated, as will be readily understood, by means of the valve l, and the water can be made to have its reverse passage through the chambers until clear water is supplied through the plugs or valves.

Should it be desired to filter the water before it is passed to the final-filtering chamber B for cleaning purposes, the valves can be regulated so as to accomplish this purpose, or should it be desired to have this water pass through the final-filtering chamber B before it passes to the primary chamber A for cleaning purposes this can be also accomplished by a proper manipulation of the valves.

Having thus described my invention, what I claim, and desire to secure by Letters Patent, is—

1. A filter comprising a vertically-arranged primary and a final filtering chamber, a vertically-arranged pipe T, the lower end of the pipe T in communication with the lower end of the final-filtering chamber, a valve regulating said communication, a pipe having communication with the water-main, and in communication with the lower end of the primary-filtering chamber, a valve controlling said communication, and an outlet-pipe having communication respectively with the upper end of the pipe T and the said primary and final filtering chambers, substantially as described.

2. A filter comprising vertically-arranged primary and final filtering chambers, a pipe T having its upper end in communication with the primary-filtering chamber, and extending downward, and its lower end in communication with the bottom of the final-filtering chamber, a pipe communicating with the water-main, and with the lower end of the primary chamber, and also with the lower end of the pipe T, a valve situated between the communications with the lower end of the said primary and filtering chambers, substantially as described.

3. A filter comprising vertically-arranged primary and final filtering chambers, a pipe G having communication with the water-main and with the lower end of the primary chamber, a pipe N having communication respectively with the upper ends of the said chambers, a return-pipe T having its upper end in communication with the pipe N and its lower end in communication with the bottom of the final-filtering chamber, and valves 1, 2, 3, 4, and 10, and the bottom of the said filtering-chambers having outlets, substantially as described.

4. A filter comprising vertically-arranged primary and final filtering chambers, a pipe G having communication with the water-main, and with the bottom of the primary-filtering chamber, a pipe N having communication respectively with the upper ends of the said primary and final filtering chambers, a pipe T having communication at its upper end with the pipe N and at its lower end with the pipe G and with the lower end of the final-filtering chamber and pipes S' depending within said chambers and the valves 1, 2, 3, 4, 5, 6, 7, 8, 9, and 10 for controlling said communications, substantially as described.

5. A filter comprising vertically-arranged primary and final filtering chambers, a pipe G having communication with the water-main and with the lower end of the primary-filtering chamber, a pipe N having communication with both of said filtering-chambers, a pipe T having its upper end in communication with the pipe N and its lower end in communication with the pipe G and with the lower end of the final-filtering chamber, the pipes S and S' depending within the said filtering-chambers, and having longitudinally-arranged passage-ways and the pipes R having communication with the lower portion of the filtering-chambers, and the valves 1, 2, 3, 4, 5, 6, 7, 8, 9, 10, 12, 13, for controlling the said communication, substantially as and for the purpose described.

In testimony whereof I affix my signature in presence of two witnesses.

MARCELLUS COLE.

Witnesses:
S. H. EVANS,
L. P. SEIBOLD.